United States Patent [19]

Baschung

[11] 4,432,637
[45] Feb. 21, 1984

[54] APPARATUS FOR THE PREPARATION OF SECTIONS OF PHOTOGRAPHIC FILM FOR PASSAGE THROUGH A CONTINUOUS PRINTER, PARTICULARLY FOR PROCESSING OF PHOTOGRAPHIC PRINT REORDERS

[75] Inventor: Michael Baschung, Zurich, Switzerland

[73] Assignee: Gretag Aktiengesellschaft, Regensdorf, Switzerland

[21] Appl. No.: 350,569

[22] Filed: Feb. 22, 1982

[30] Foreign Application Priority Data

Feb. 20, 1981 [CH] Switzerland .................. 1146/81

[51] Int. Cl.³ .......................... G06K 7/10; G06K 7/14
[52] U.S. Cl. ...................................... 355/35; 355/40; 355/50; 235/454; 235/464
[58] Field of Search ................ 235/454, 375; 355/40, 355/45, 50, 51, 35

[56] References Cited

U.S. PATENT DOCUMENTS 4,128,330 12/1978 Fergg ................................. 355/40
4,278,346 7/1981 Toriumi ............................. 355/45
4,294,537 10/1981 Laska .................................. 355/50

Primary Examiner—Harold I. Pitts
Attorney, Agent, or Firm—Burns, Doane, Swecker & Mathis

[57] ABSTRACT

A transport device conveys film sections, possibly equipped with a reorder strip and mounted on a carrier strip, stepwise through an inspection section. An entering keyboard is provided to read the data to be assigned to each image frame of the film strips into a memory. The input keyboard is coupled by means of a computer with a display device in order to display the data entered.

To render the inspection and possibly the correction of data entered for film sections located in the inspection section possible, at least a part of the display device extends essentially along the entire inspection field, while the computer is equipped to cause the data displayed on this part of the display device to run in an essentially synchronous manner with the conveying motion of the film sections on the carrier strip.

8 Claims, 5 Drawing Figures

APPARATUS FOR THE PREPARATION OF SECTIONS OF PHOTOGRAPHIC FILM FOR PASSAGE THROUGH A CONTINUOUS PRINTER, PARTICULARLY FOR PROCESSING OF PHOTOGRAPHIC PRINT REORDERS

BACKGROUND OF THE INVENTION

The present invention relates to an apparatus for preparation of sections of photographic film for passage through a continuous photographic printer, particularly for the processing of photographic print reorders.

During the processing of photographic print reorders it is customary to combine the masters (negative film), usually present in the form of film strips of varying length, i.e. encompassing different numbers of image frames, by means of a carrier strip into a coherent reorder strip and to generate simultaneously or subsequently a data carrier, for example on magnetic tape, upon which all reorder data are recorded in fixed coordination with the individual image frames of the reorder roll. The reorder strip can then be processed in a fully automatic manner on the basis of the stored data.

The work processes required for the production of the roll of film and the associated data carrier are of particular importance, as these are practically the only ones at the present time which cannot be effected in a fully automatic fashion. Generally, the film strips are inspected in a control station either after or immediately prior to splicing and the reorder data (number of copies and possibly correction data) are fed for each individual image frame of a strip into the storage device, with the data inserted being displayed on a display device for inspection.

The devices known heretofore for this purpose have a number of disadvantages. Thus, for example, the display of the data fed in for an image frame or film strip disappears upon the input of data for the following image frame or a new film strip, or else there exists no direct spatial coordination between the display of data and the corresponding image. It is therefore difficult or impossible to subsequently examine potentially incorrect input data and to correct them.

A roll copying device is described in DE-A-22 34 895, wherein the spliced film strips are passed through a preinspection section, wherein correction data are assigned to each image frame. A row of light emitting diodes is arranged along the preinspection section, whereby it is indicated for which of the image frame located nerest to the printer there has been as yet no input of a correction value (cursor function), with the light emitting diode cursor travelling together with the image frame, in coordination with it. However, the values fed in are not displayed.

DE-No.-A-25 18 580 describes a reorder system wherein the reorder data contained in tables are transferred to a data carrier in coordination with the image frames of the spliced film strips. The individual film strips are introduced in an observation field, along side which a plurality of light emitting diodes is arranged in coordination with the image frames. The light emitting diodes have cursor function and are lighting up at locations wherein the associated image frame is indicating a reorder. A correction value may be inserted at these locations. As with the device of DE-No.-A-22 34 895, here again there is no display of the input.

DE-No.-A-25 57 755 describes a system for the preparation of printing masters for a subsequent printing process. In a preinspection station, the film strip is combined with a paper strip, provided for the reception of printing data. A display is provided along a preinspection section, upon which automatically measured correction data are appearing in fixed coordination with the individual image frames. These data are then either read or written manually on the strip of paper, or transferred automatically for example by means of a punched code, to the strip. No details for effecting the process are given in DE-No.-A-25 75 755.

OBJECTS AND BRIEF SUMMARY OF THE INVENTION

It is an object of the present invention to eliminate the abovementioned disadvantages and to provide an improved apparatus of the above-defined type which may be operated as conveniently and free of errors as possible and in which potential errors may be recognized and corrected in a convenient and simple manner.

It is a further object of the present invention to provide a system for processing photograph print reorders in which reorder data is display and moves along with the associated frames of the photographic film strips through the length of an inspection and input station, in a manner permitting correction of the reorder data.

The foregoing and other objects and advantages are provided in accordance with the present invention by the provision of display extending essentially along an inspection section of the apparatus, preferably substantially parallel to the direction of transport of a print reorder strip, wherein, on the display, at least the number of reorder prints moves along with the individual image frames of a film strip over a certain distance, the numbers being preserved over the said distance and being placed in storage only subsequently. In this manner, the operator is provided with a good overview of the latest input and is readily able to detect potential errors, which then may be easily corrected by simple manipulations.

BRIEF DESCRIPTION OF THE DRAWINGS

The invention will become apparent to one skilled in the art to which the invention pertains from the following detailed description with the aid of the appended drawings in which.

DETAILED DESCRIPTION

Figure 1:
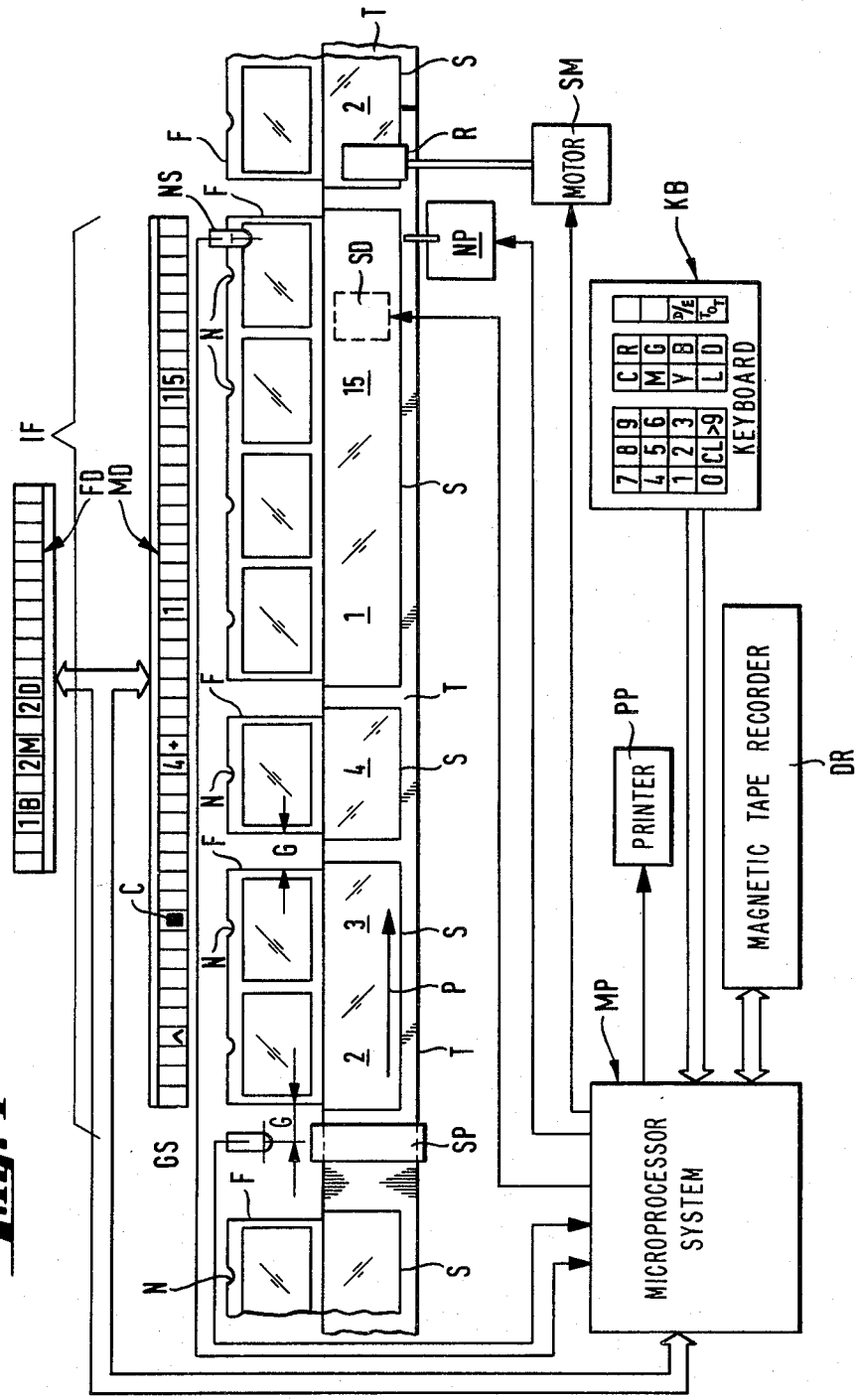
FIG. 1 shows a simplified schematic block diagram of an apparatus according to the invention.

In FIG. 1, a row of film sections F of different lengths are equipped with a laterally spaced apart reorder strip S and combined in a known manner by means of a carrier strip T into a coherent reorder strip. Of course, the reorder strips S may be absent, in which case the film sections F would be attached directly to the carrier strip T.

The reorder strip passes through an inspection and input section IF, on an inspection table, not shown, or the like, in the direction of the arrow P, the inspection section lying between two sensors GS and NS. The sensor GS on the input side scans the leading and trailing edges of the film strip F, while the sensor NS on the output side reacts to the positioning notches N present on the film strip F. A pair of rolls R driven by a stepping motor SM is provided for the transport of the reorder strip. A winding device W, not shown in FIG. 1, winds the strip into a roll after it leaves the input section. A splicing device SP is further arranged adjacent the sensor GS to join the individual film strips F with the carrier strip T.

An elongated multidigit alphanumeric display MD is arranged parallel to the path of the reorder strip, within the input section IF and between the two sensors GS and NS, with a second, smaller alphanumeric display FD being located above it. The two displays optically reproduce the reorder data fed in by means of a keyboard KB.

The device represented further comprises notch punch NP to copy the positioning notches N detected by the notch scanner NS into the carrier strip T, a strip printer SD to print the specific reorder data onto the reorder strip S or the carrier strip T, respectively, a pocket printer PP to print on order pockets (envelopes), a magnetic tape recording device DR and a microprocessor system MP to actuate all of the beforementioned functional units.

Figure 2:
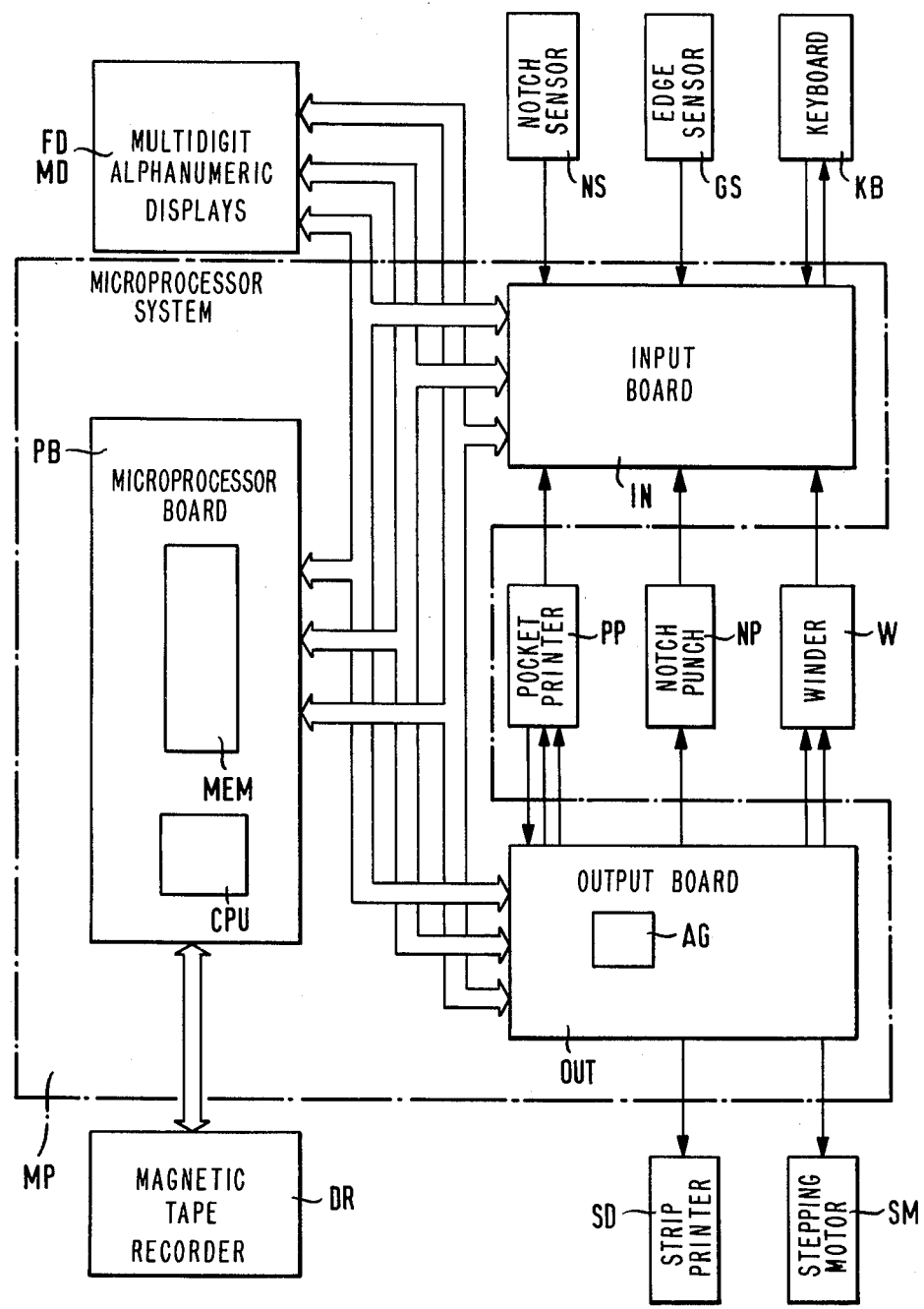
FIG. 2 is an electric circuit diagram illustrating the apparatus of FIG. 1 in more detail.

FIG. 2 shows another representation of the electric circuit connecting the individual parts in a clearer manner. The microprocessor system MP comprises a processor board PB with the processor CPU and program and working memories MEM, etc., together with an input and an output borad IN and OUT, establishing the connection with the abovementioned peripheral functional units. The output board OUT contains in addition to various driver circuits additionally and alarm emitter AG for the audible indication of defective or inadmissible operating conditions.

The operation of the apparatus if as follows:

When a film strip F enters the input section in the direction of the arrow P, it is initially advanced until the front sensor GS recognizes the trailing edge of the strip F. This is followed directly by an accurately defined advance corresponding to the (constant) space G between two successive film strips F, hereinafter designated the gap advance. The advance of the strip is then arrested, and a blinking light signal C now appears on the lower, longer display MD, in the position of the foremost image frame of the incoming film strip F; this signal is designated a cursor. The cursor indicates the image frame on a strip for which no input has been effected or for which an input is to be made. By means of the keyboard KB, the number of the prints to be made of the image frame involved and any potential correction data are fed in. The number of prints appears on the lower display MD, in accurate spatial coordination with the image frame and this display remains for all of the image frames located within the input section. Correction data are indicated on the upper display FD, but only during the input operation. Following the input of the number of prints which terminates the input of data, the correction data disappear. If correction data are associated with an image frame, this will be indicated on the lower display MD by a special symbol, for example, a plus sign adjacent to the number of prints.

After the input of the reorder data for the foremost image frame has been completed, the cursor C jumps automatically to the image frame arriving next on the input side, whereupon the input for this frame is effected, etc. When in this manner all of the reorder data for the film strip F are fed in and stored in the memory, the entire reorder band is transported further to the right as long as a new film strip is masking the sensor GS, until the left edge of the new film strip is located within the input section. The print numbers indicated in the display field MD for the preceding film strip or strips are preserved and travel in fixed coordination with the films strips and their image frames, respectively. This is followed by the input of the reorder data for the strip F in exactly the same manner as for the first film strip, etc.

When the notch sensor NS recognizes a positioning notch N in the edge of the film strip, at the right hand end of the input section and when simultaneously the print number entered for the image frame involved is $\neq 0$, the reorder strip is briefly stopped and a print notch is punched into the carrier strip T by the edge punch NP.

When an image frame then leaves the input section, the number of prints assigned to it drops out of the display field MD. Prior to this, however, the value involved, together with any correction data potentially associated with it, is definitively placed in the memory.

As long as a film strip F and its image frames, respectively, are located within the input section within the two sensors, or in other words, as long as the number of prints is appearing within the display field, the reorder data indicated may be corrected. For this purpose, the cursor C is positioned by means of the keyboard KB to the location of the image frame to be corrected and the correction is effected correspondingly.

To facilitate and simplify final processing during the execution of reorders, means are provided to enter certain specific order data, such as for example order number, type of film, etc. and to display them in the upper display field FD for the duration of the passage of the film strips belonging to one order and further to print these data onto the order pocket (envelope) by means of the pocket printer PP and on the carrier strip T by means of the strip printer SD.

When in this manner the reorder data for the entire reorder have been entered, the order may be closed by means of the keyboard KB. The reorder data are then transferred to a magnetic tape cassette by means of the data recorder DR. The cassette is then further processed together with the reorder film roll.

Figure 3:
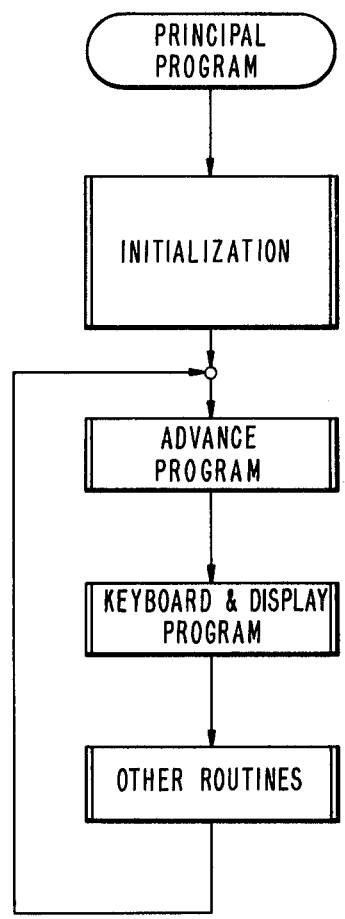
FIGS. 3–5 are flow diagrams of the operations performed by the apparatus of FIGS. 1 and 2, particularly operating programs of the microprocessor.
Figure 4:
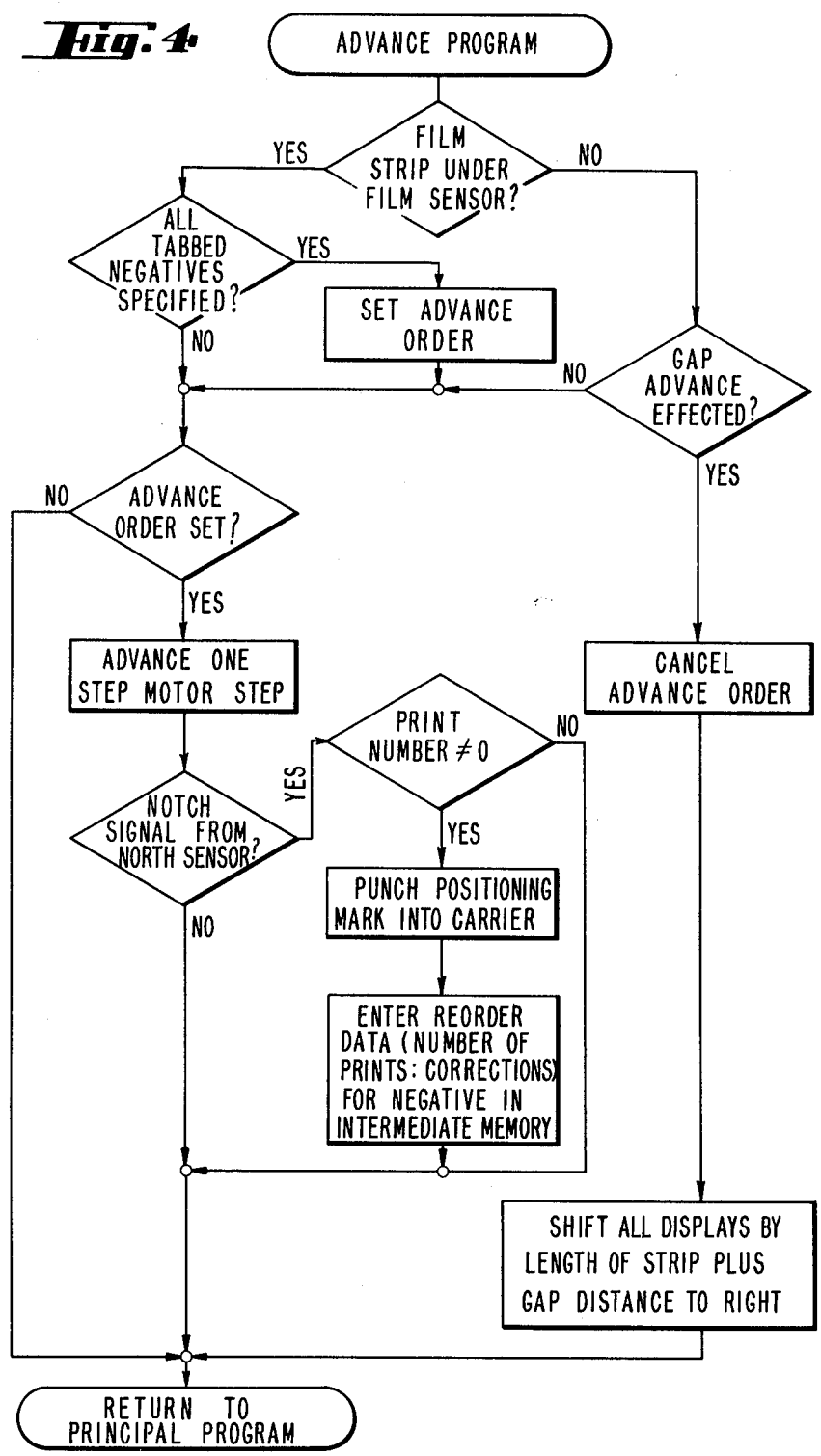
Figure 5:
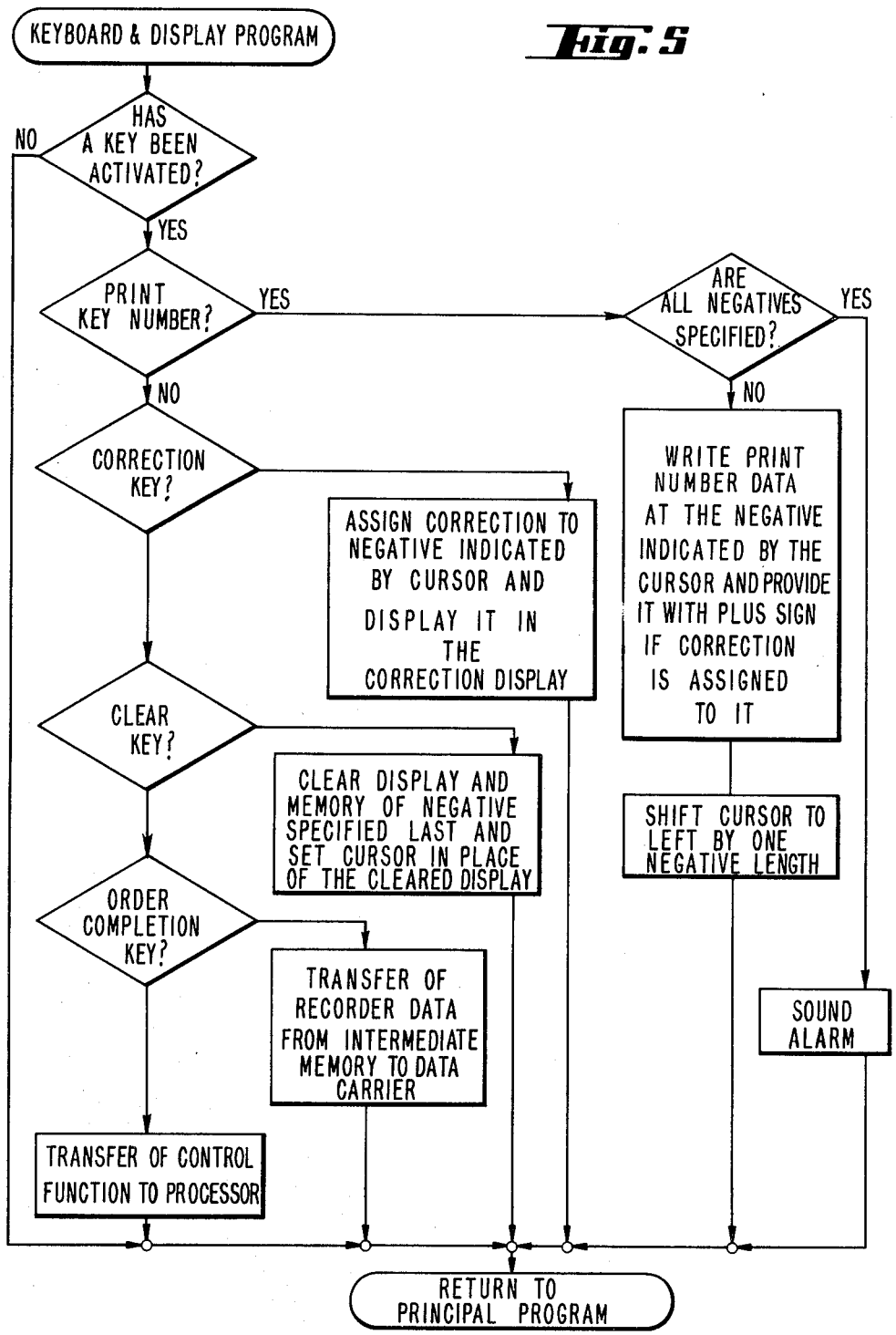

As mentioned hereinabove, the aforedescribed apparatus is controlled by a microprocessor system. For example, the INTEL microprocessor 8085 may be used for the purpose, together with its modules. Details, to the extent not already familiar to those skilled in the art, may be found in the data and application sheets of the manufacturers. The program sequences for the execution of the most important operational segments are summarized schematically in the flow sheets shown in FIG. 3-5. The individual functional modules are readily understood by persons skilled in the art and require no further explanation.

I claim:

1. Apparatus for the preparation of sections of film for passage through a continuous printer, in particular for the processing of photographic print reorders, including a transport installation for the conveying of film sections mounted on a carrier strip through an inspection section and a device for generating and entering printing data for the individual image frames of the sections of film on a data carrier in coordination with the individual image frames, said device being equipped with a keyboard for entering the printing data and a display for displaying the data entered, wherein at least one part of the display extends essentially along the inspection section, and including electrical means for effecting the display of at least a part of the entered printing data in direct positional coordination with the image frames of the film sections on said part of the display and for causing the printing data appearing on said part of the display to move essentially in synchronization with the transport motion of the film sections, thereby maintaining direct positional coordination of said data with associated image frames of said film sections.

2. Apparatus according to claim 1 wherein said electrical means includes means for effecting the display of an indicator on said part of the display in direct positional coordination with a selected one of the image frames of the film sections, said indicator marking the image frame to which the instantaneously entered printing data are being assigned.

3. Apparatus according to one of claims 1 or 2 wherein said electrical means effects the display of the number of reorder prints on said at least one display part.

4. Apparatus according to claim 3 wherein the display comprises a second part and the electrical means includes means for effecting the display of print correction data for the image frame instantaneously marked by the indicator to appear on said second display part.

5. Apparatus according to claim 2, wherein the electrical means includes means for moving the indicator automatically after the completion of each entering of printing data by an image frame, said indicator being automatically moved against the conveying direction of the film strips, and including means providing an alarm which is actuated when there is no longer an indicator in said display part.

6. Apparatus according to one of claims 1, 2 or 5, wherein said electrical means has associated with it a sensor means for sensing the gaps between successive film strips, said sensing means and said electrical means controlling the conveying motion of the film strips in cooperation with the transport installation so that always a complete film strip is introduced in said inspection section provided its length does not exceed the length of the inspection section.

7. Apparatus according to one of claims 1, 2 or 5, wherein essentially at the end of the inspection section, a notch scanner and an edge notch punch are disposed to sense a notch on the edge of the film strip and, with said notch punch, to place a notch on the carrier strip in response to said sensed notch on the film strip.

8. Apparatus according to one of claims 1, 2 or 5, wherein said electrical means has associated with it a sensor means for sensing the trailing edge of the film strip as it moves in the conveying motion of the transport installation, and wherein said electrical means includes means for effecting a predetermined gap advance of said film strip in response to the sensing of said trailing edge by said sensor means.

* * * * *